US010676248B2

(12) United States Patent
Kuo

(10) Patent No.: US 10,676,248 B2
(45) Date of Patent: Jun. 9, 2020

(54) INJECTION MOLDED LID

(71) Applicant: Tse-Huang Kuo, Taipei (TW)

(72) Inventor: Tse-Huang Kuo, Taipei (TW)

(*) Notice: Subject to any disclaimer, the term of this patent is extended or adjusted under 35 U.S.C. 154(b) by 172 days.

(21) Appl. No.: 15/579,214

(22) PCT Filed: Jul. 23, 2015

(86) PCT No.: PCT/CN2015/084918
§ 371 (c)(1),
(2) Date: Dec. 4, 2017

(87) PCT Pub. No.: WO2017/012115
PCT Pub. Date: Jan. 26, 2017

(65) Prior Publication Data
US 2018/0134465 A1    May 17, 2018

(51) Int. Cl.
*B65D 43/02* (2006.01)
*B29C 45/16* (2006.01)

(52) U.S. Cl.
CPC ..... *B65D 43/0212* (2013.01); *B65D 43/0222* (2013.01); *B29C 45/1676* (2013.01); *B65D 2543/00046* (2013.01); *B65D 2543/0075* (2013.01); *B65D 2543/00092* (2013.01); *B65D 2543/00231* (2013.01); *B65D 2543/00296* (2013.01); *B65D 2543/00527* (2013.01); *B65D 2543/00537* (2013.01); *B65D 2543/00638* (2013.01); *B65D 2543/00657* (2013.01); *B65D 2543/00694* (2013.01); *B65D 2543/00759* (2013.01); *B65D 2543/00796* (2013.01); *B65D 2543/00805* (2013.01)

(58) Field of Classification Search
CPC ............ A47G 19/2272; B65D 43/0212; B65D 43/0222; B65D 2543/00046; B65D 2543/00092; B65D 2543/00231; B65D 2543/00296; B65D 2543/00527; B65D 2543/00537; B65D 2543/00638; B65D 2543/00657; B65D 2543/00694; B65D 2543/0075; B65D 2543/00759; B65D 2543/00796; B65D 2543/00805; B29C 45/1676
USPC ...................... 220/315, 254.1, 254.7, 319, 78
See application file for complete search history.

(56) References Cited

U.S. PATENT DOCUMENTS

| 4,119,239 | A | * | 10/1978 | Anderson | .......... B65D 43/0212 |
| | | | | | 220/284 |
| 4,625,890 | A | * | 12/1986 | Galer | ................. B65D 55/0818 |
| | | | | | 220/319 |
| 2014/0217101 | A1 | * | 8/2014 | Wang | ..................... B65D 45/00 |
| | | | | | 220/324 |

FOREIGN PATENT DOCUMENTS

GB        2556618 A * 6/2018 ......... B65D 43/0212

* cited by examiner

*Primary Examiner* — Andrew D Perreault

(57) ABSTRACT

An injection molded lid (100) for use with a container, which includes a lid body (110) and a securing member (150). The lid body (110) includes a cover portion (120) and a flange portion (130). One side wall (134) of the flange portion has one or more notches (138). The securing member (150) includes a frame (152) and at least one tab (154). The tab (154) covers the notch. The securing member (150) provides extra fastening strength that prevents the spillage or leakage of the content within the container.

13 Claims, 12 Drawing Sheets

INJECTION MOLDED LID

BACKGROUND OF THE INVENTION

1. Field of the Invention

The present disclosure relates to a lid for use with a container; and more particularly to a lid having a securing member for reducing or eliminating the likelihood of the contents of the container from spilling, leaking, or dripping.

2. Description of Related Art

In the modern setting, many foods, such as beverages, are consumed in transit, thereby creating the need for disposable, or single-use, containers and lids. Disposable containers are often made from papers, cardboards, plastics, or laminated materials; whereas the lids are mostly made of plastics. During the storage period, the containers and lids usually suffer from deformation due to the environmental temperature and relative humidity levels or fluctuations. However, since the container and the lid are often made of different materials (or in the case where both the container and the lid are made of the same plastic, have different shapes and sizes), the deformation level of the two under the same storage condition may not match each another. This difference of the deformation level may result in certain imperfections or flaws in the connection interface between the container and lid, and hence, the liquid (e.g., beverage) in the container tends to seep through these imperfections or flaws, thereby causing the leaking or dipping. This problem is more common while the containers and lids are stored after a certain storage period, in particular, in humid environment or harsh weathers.

To ensure that the container and the lid forms a tight closure even after a substantial storage period in various storage conditions, most manufactures for disposable containers and lids adopts very stringent manufacturing requirements covering the source, supplier and specification of the raw materials, processing procedures, as well as the specification of the final products. In many cases, the buying party would even require that both the containers and lids to be manufactured by the same manufacturer to reduce the tolerance between the containers and lids.

Further, the body of most disposable containers is not very rigid, meaning that the body of such container tends to deform while the consumer is gripping or even squeezing the body of the container or while the container is knocked over. In these cases, the lid may separate from the container, thereby causing liquid spillage. Of course, there are many additional scenarios where a container covered with a lid fails to prevent the content within the container from spilling, leaking, or dripping therefrom.

In view of the foregoing, consumers, while handling the container or consuming the food (in particular, beverage) in the container, still experience spillage or leakage from time to time. Accordingly, there exists a need in the related art for providing a lid capable of minimizing or reducing spillage, leakage, or drippage of the content in a container.

SUMMARY

The following presents a simplified summary of the present disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In some aspects, the present disclosure is directed to a lid for providing a tight closure for a container having an upper opening defined by a rim. In particular, the present lid is manufactured by injection molding, and is provided with a securing member so that when the lid is fit over the rim of the container, the securing member provides extra fastening strength that prevents or reduces the spillage, leakage, and/or drippage of the content within the container.

According to the first aspect of the present disclosure, the injection molded lid comprises a lid body and a securing member, respectively made of a first material and second material. The lid body comprises a cover portion and a flange portion disposed around the periphery of the cover portion for fitting over the rim of the container. The flange portion comprises a first side wall and a second side wall. The first side wall is connected with the periphery of the cover portion. The second side wall has at least one notch disposed thereon and comprises at least one bulge disposed at the inner surface thereof for engaging the injection molded lid with the rim of the container. The securing member comprises a frame and at least one tab. The frame connects the upper sides of the first and the second side walls. The tab extends downwardly from the frame along the outer surface of the second side wall and covers the notch.

Alternatively, in the second aspect, the injection molded lid comprises a lid body and a securing member, respectively made of a first material and second material. The lid body comprises a cover portion and a flange portion disposed around the periphery of the cover portion for fitting over the rim. The flange portion comprises a first side wall, a second side wall, and a top wall comprising at least one slit disposed thereon. The first side wall is connected with the periphery of the cover portion. The second side wall comprises at least one notch disposed thereon and at least one bulge disposed at the inner surface thereof for engaging the injection molded lid with the rim of the container. Together, the top wall, the first side wall, and the second side wall define an interior space. The securing member comprises a frame, at least one tab, and at least one extension part. The frame is disposed within the interior space and adjoins at least the top wall. The extension part extends from the frame through the slit and rests on the top wall. The tab extends downwardly from the extension part along the outer surface of the second side wall and convers the notch.

In the third aspect, the present injection molded lid comprises a lid body and a securing member. The lid body comprises a cover portion and a flange portion disposed around the periphery of the cover portion for fitting over the rim. The flange portion comprises a first side wall, a second side wall and a top wall, in which the inner surfaces of the first and the second side walls and the top wall define an interior space, the first side wall is connected with the periphery of the cover portion, and the second side wall comprises at least one notch disposed thereon. The securing member comprises a frame and at least one tab. The frame is disposed within the interior space and adjoins at least the top wall of the flange portion of the lid body. The tab extends downwardly from the frame along the inner surface of the second side wall, and the lower edge of the tab is disposed across the bottom opening of the notch. The tab further comprises at least one bulge for engaging the injection molded lid with the rim of the container.

In optional embodiments, the second side wall of the lid body comprises a plurality of the notches. In optional embodiments, the securing member comprises a plurality of the tabs. Still optionally, the number of the notch is equal to the number of the tab. Alternatively, at least one tab is configured to cover two or more notches.

According to various embodiments of the present disclosure, the first material and the second material are different materials with a same color or different colors. Alternatively, the first material and the second material are the same material but with different colors. For example, each of the first material and the second material is polystyrene (PS), copolymers of carboxylic acid monomers with ethylene, polystyrene-acrylonitrile (PSAN), acrylonitrile-butadiene styrene (ABS), stryrene-maleicanhydride (SMA), cellulose ethers, polycarbonate (PC), polyethylene (PE), polyamides, polyethylene terephthalate (PET), polypropylene (PP), polyvinyl chloride (PVC), polyvinylcyclohexane, phenoxy type thermoplastic polymer, polyolefins, phenoxy-polyolefin thermoplastic blends, thermoplastic elastomer (TPE), silicone, or ultra-low density polyethylene (ULPDE) resin, or copolymers or blends thereof. Common thermoplastic elastomers includes, but are not limited to, styrenic thermoplastic elastomer (TPS), thermoplastic rubber (TPR), thermoplastic polyolefin (TPO), thermoplastic polyurethane (TPU), thermoplastic vulcanizate (TPV), and thermoplastic polyester elastomer (TPEE). In certain embodiments, the second material is preferably TPE, silicone, or ULPDE resin. In certain embodiments of the present disclosure, the first material is polypropylene and the second material is thermoplastic polyurethane.

In some optional embodiments, the lid body further comprises a pattern layer disposed on the outer surface of the cover portion. The pattern layer is made from the first material, the second material, or a third material, or a combination thereof. Illustrative third material comprises thermoplastic materials (such as, PP, PE, PVC and silicone) comprising a theremochromic material.

In optional embodiments of the present disclosure, the lid body further comprises one or more access holes disposed on the cover portion. Still optionally, the lid body further comprises a cap connected to the cover portion and configured to cover the access hole, wherein at least one portion of the cap is separable from the cover portion to expose the access hole. Additionally, the present injection molded lid may further comprise a cap rim disposed along at least one portion of the periphery of the cap for separably connecting the portion of the periphery of the cap with at least one portion of the periphery of the access hole. In certain embodiments, the thickness of the cap rim is smaller than the thickness of the cap. Alternatively or additionally, the cap is made of the first material and the cap rim is made of the second material.

According to some embodiments of the present disclosure, the cap further comprises a ridge. Still optionally, the cover portion may further comprise a receptacle configured to accommodate the ridge.

In some optional embodiments, the injection molded lid may further comprise an air hole disposed on the lid body.

Regarding the injection molded lid according to the second aspect of the present disclosure, the extension part of securing member may optionally extend along a portion of the periphery of the top wall.

In the cases where the tab extends along the inner surface of the second side wall, the inner surface of the second side wall may optionally comprise at least one recessed area, and at least a portion of the tab is disposed in the recessed area. Alternatively or additionally, the flange portion may further comprise at least one pair of ribs, in which each rib is disposed at one side of the notch and along the longitudinal direction of the second side wall, and the two sides of the tab is disposed in the paired ribs.

For the injection molded lid according to the third aspect of the present disclosure, the second side wall may optionally comprise at least one bulge disposed at the inner surface thereof for engaging the injection molded lid with the rim of the container.

In another aspect, the present disclosure is directed to a container and lid assembly that comprises a container and an injection molded lid according to any of the above-mentioned aspects and/or embodiments of the present disclosure.

According to various embodiments of the present disclosure, the container comprises a container body, a rim disposed at the top and along the periphery of the container body, and an upper opening defined by the rim. The present injection molded lid, when used with the container, facilitates the placement of the lid onto the container, and provides a tighter closure therebetween.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1A:
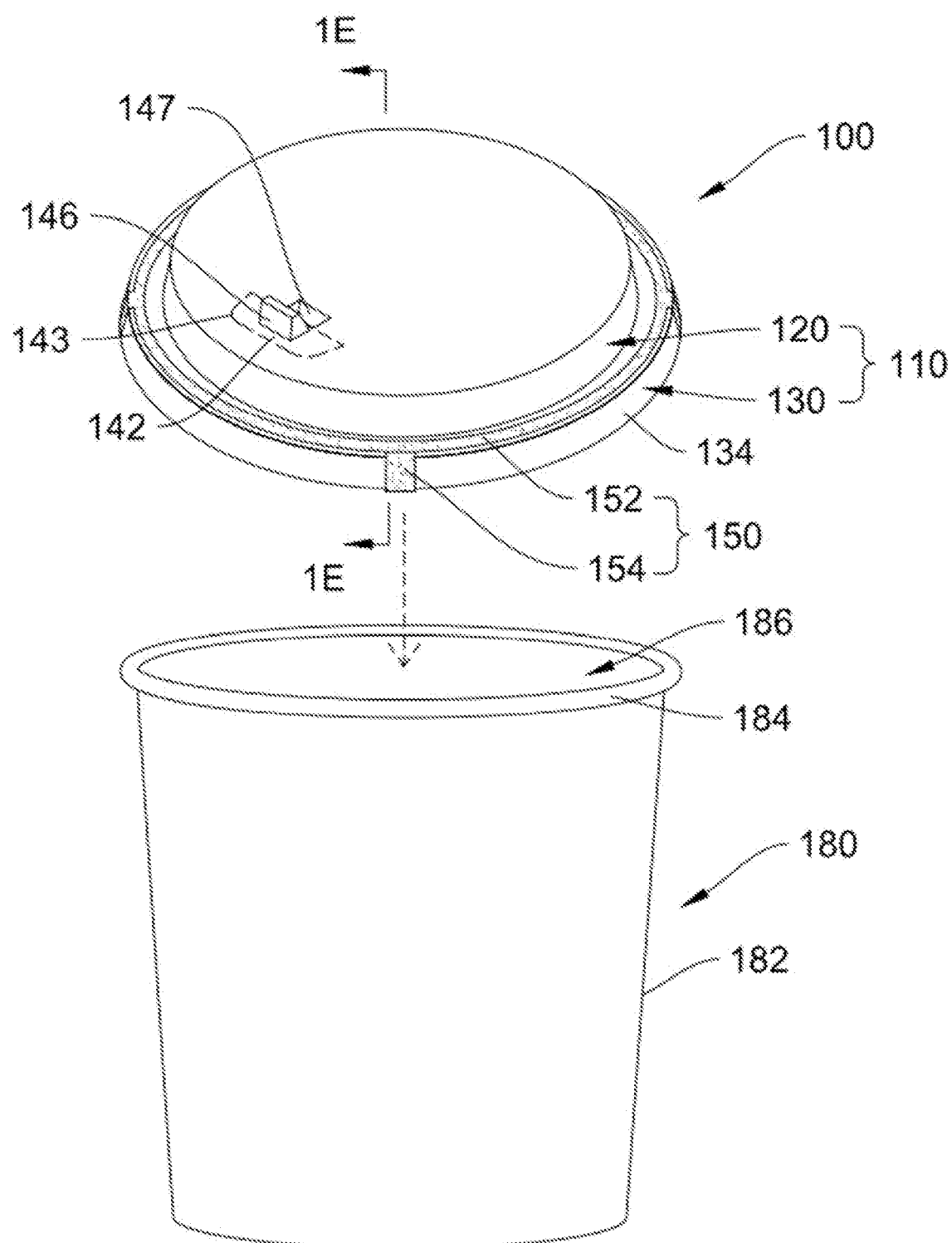
FIG. 1A is a schematic diagram illustrating a container and lid assembly according to one embodiment of the present disclosure.

In accordance with common practice, the various described features/elements are not drawn to scale but instead are drawn to best illustrate specific features/elements relevant to the present invention. Also, like reference numerals and designations in various drawings are used to indicate like elements/parts.

DESCRIPTION

The detailed description provided below in connection with the appended drawings is intended as a description of the present examples and is not intended to represent the only forms in which the present embodiments may be constructed or utilized. The description sets forth the structures and/or functions of the embodiments and/or the sequence of steps for constructing and/or operating the embodiments. However, the same or equivalent functions and sequences may be accomplished by other embodiments.

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Throughout the present disclosure, the term "container" is intended to include any article, receptacle, or vessel utilized for storing, dispensing, packaging, or portioning items. Examples of such containers include, but are not limited to, boxes, cups, jars, bottles, bowls, plates, cartons, cases, crates, dishes, or other types of holders. The term "disposable container" as used in this specification and the appended claims refers to a container that has the characteristics typically associated with disposable materials. However, the use of the term "disposable" does not mean that the container must necessarily only be a single-use container and that it be discarded after only one use. According to certain embodiments of the present disclosure, the container is used to hold foods, including beverages.

As used herein, the term "injection molded" is used to modify an article (such as, a lid) that is made by injection molding techniques described herein. The term "injection molding" refers broadly to any technique for injecting one or more material (injectant) into a mold to produce an article with the desired shape or configuration. Non-limiting examples of materials suitable to be used as the injectant include thermoplastic polymers, thermosetting polymers, elastomers, metals, glasses, and ceramics.

The present disclosure aims to improve the coupling of a lid and a container by providing a novel injection molded lid with a securing member. Accordingly, in one aspect, the present disclosure is directed to an injection molded lid with a securing member for minimizing or reducing spillage, leakage, or drippage of the content in a container when the lid is fitted over the container. Further, also falls within the scope of the present disclosure is a container and lid assembly that comprises the above-mentioned injection molded lid and a container.

As could be appreciated, the present container and lid assembly comprises a container and an injection molded lid. The container has a container body and a rim, in which the rim is disposed at the top and along the periphery of the container body and defines an upper opening of the container.

According to various embodiments of the present disclosure, the container may have any desired cross-sectional shape, such as, circular, oval, polygonal, or irregular shape. The present injection molded lid is intended to be fitted over the container to cover the opening of the container and prevent the content held in the container body from coming out of the container easily, and accordingly, the cross-sectional shape of the injection molded lid should substantially match that of the container.

Regarding the structure of the present injection molded lid, it comprises a lid body made of a first material and a securing member made of a second material. Generally, the lid body comprises a cover portion and a flange portion disposed around the periphery of the cover portion for fitting over the rim. Also, the securing member comprises a frame and at least one tab.

In the first aspect, the flange portion of the lid body comprises a first side wall and a second side wall, in which the upper sides of the first and a second side walls are connected by the frame of the securing member, the first side wall is connected with the periphery of the cover portion, while the second side wall has at least one notch disposed thereon and comprises at least one bulge disposed at the inner surface thereof for engaging the injection molded lid with the rim of the container. The tab of the securing member extends downwardly from the frame along the outer surface of the second side wall and covers the notch.

In the second aspect, the flange portion of the lid body comprises a first side wall, a second side wall, and a top wall. The first side wall is connected with the periphery of the cover portion. The top wall connects the first and the second side walls, thereby defining an interior space; also, the top wall comprising at least one slit disposed thereon. The second side wall has at least one notch disposed thereon and comprises at least one bulge disposed at the inner surface thereof for engaging the injection molded lid with the rim of the container. The frame of the securing member is disposed within the interior space and adjoins the top wall. The securing member also comprises at least one extension part, which extends from the frame through the slit and rests on the top wall. The tab extends downwardly from the extension portion along the outer surface of the second side wall and convers the notch.

In the third aspect, the flange portion comprises a first side wall, a second side wall, and a top wall. The first side wall is connected with the periphery of the cover portion. The top wall connects the first and the second side walls, thereby defining an interior space. The second side wall has at least one notch disposed thereon. The frame of the securing member is disposed within the interior space and adjoins at least the top wall of the flange portion of the lid body. The tab extends downwardly from the frame along the inner surface of the second side wall in which the lower edge of the tab is disposed across the bottom opening of the notch. Further, the tab comprises at least one bulge for engaging the injection molded lid with the rim of the container.

As could be appreciated by persons having ordinary skill in the art, many variations or modifications could be made to the above-mentioned basic structures of the present injection molded lids and the container and lid assembly for functional, aesthetic, and/or economic purpose(s).

For example, one purpose of the rim of the container is for engaging with the injection molded lid. In one example, the rim is a frame-like structure of a certain thickness that disposed around the peripheral of the container body at the top. However, the shape and the dimension of the rim may vary depending on the need(s) of the manufacturer, buying party, and/or consumer, as long as the structure of the rim allows the engagement with the present injection molded lid. In various optional embodiments, the upper surface of the rim may be curved or flat. Also, the surface at the side periphery of the rim can be curved, flat, or otherwise patterned. Still optionally, the lower edge of the rim may incline toward or away the container body or parallel the container body.

As to the cover portion of the lid body, the uppermost point (or surface) of the cover portion may be disposed above, below, or level with the top wall of the flange portion. Further, the cover portion may generally have a frustoconical, cylindrical, hemispherical, or any other suitable shape. Also, the cover portion may be configured to have one or more elevated, recessed, slope area, or any combination of the above.

According to various embodiments of the present disclosure, the lid body of the injection molded lid may comprise one or more notches disposed on the second side wall. For example, the injection molded lid may have one, two, three, four, five, six, seven, eight, nine, ten, or more notches disposed on the second side wall of the flange portion thereof. Preferably, these notches are spaced equidistantly around the periphery of the flange portion. The notch on the second side wall of the flange portion may be shaped into an arc, triangular, quadrilateral (e.g., rectangular, trapezoid, or parallelogrammatic), or S shape, or any desired shape. The design of the notch provides flexibility for placing the present injection molded lid onto the container so that the user may close the container single-handedly.

One purpose of the tab is to prevent the formation of slits from the notch, thereby enhancing the structural integrity of the lid body. Accordingly, in some embodiments, the tab covers the opening of the notch; while in some other cases, the width of the lower edge of the tab is no shorter than the width of the bottom opening of the notch such that the lower edge of the tab is configured to be disposed across the bottom opening of the notch. The tab can be formed as a flat piece or a frame, and the shape of the tab may or may not match the shape of the notch.

Another purpose of the tab is to provide a securing means that improves the engagement between the present lid and the container. This could be achieved by one or more of the following means. For example, the surface of the tab that is to be in contact with the rim of the container may be designed to have one or more bulges for such engagement. Alternatively or additionally, the tab may be injected molded by an elastic material; in this way, while putting the present injection molded lid onto the container, the elastic tab may be stretched slightly thereby resulting the expansion of the notch opening to facilitate the placement of the present lid onto the container, and after the placement of the lid, the elastic tab may return to its original dimension which in turn tightens the engagement with the container. Either way, the overall tightness of the present injection molded lid with the container may be improved, which prevents leakage when the container is not upright and which does not disengage upon being subjected to forces that may be incurred during certain uses, such as dropping, tipping, falling or squeezing of the container/lid with a liquid or the like therein.

As discussed above, one or more notches may be disposed at the flange portion of the lid body. Similarly, the securing member may have one or more tabs. In certain embodiments, the number of the notch is equal to the number of the tab. Alternatively, at least one tab may be configured to cover two or more notches.

Each tab may be optionally disposed with one or more bulges that facilitate the engagement of the present injection molded lid with the rim of the container. Similarly, the inner surface of the second side wall of the flange portion may be disposed with one or more bulges for engaging with the rim of the container. In some cases, both the tab and the second side wall may have the bulge.

According to certain embodiments of the present disclosure, when the tab is disposed at the inner surface of the second side wall of the flange portion, the inner surface of the flange that is in contact with the tab is recessed in relative to the inner surface of the second side wall that is not in contact with the tab, thereby forming a recessed area for accommodating at least a portion of the tab. In this way, the contacting surface of the tab (i.e., the surface configured to be in contact with the rim of the container) is level with the inner surface of the second side wall that is not in contact with the tab.

According various optional embodiments, the lid body further comprises at least one pair of ribs, in which each rib is disposed at each side of the notch and along the longitudinal direction of the second side wall. The inner surface of the rib is recessed in relative to the inner surface of the remainder of the second side wall, thereby forming a recessed area to accommodate the two sides of the tab.

As discussed above, the lids according to various embodiments of the present disclosure are prepared by injection molding. Injection molding is a manufacturing process in which the injectant is heated until it becomes pliable and then injected into a mold cavity, where it cools and hardens to the configuration of the cavity. Common injectants including metals, glasses, elastomers, and thermoplastic and thermosetting polymers. According to various embodiments of the present disclosure, the injectants for manufacturing the present injection molded lid may be elastomers, thermoplastic polymers, or thermosetting polymers.

In particular, the present lid comprises two portions (i.e., the lid body and the securing member) that are injected molded by a first material and a second material, respectively. According to various embodiments of the present disclosure, the first material and the second material can be different materials with a same color or different colors, or the same material with different colors. For example, the lid body may be prepared by hard thermoplastic materials such as polypropylene while the securing member may be prepared by an elastomer. Preferably, at least one of the first and second materials is a food grade material according to certain embodiments of the present disclosure. Still optionally, at least one of the first and second materials may be a biodegradable material.

In some embodiments, each of the first material and the second material may be any of the following: polystyrene (PS), copolymers of carboxylic acid monomers with ethylene, polystyrene-acrylonitrile (PSAN), acrylonitrile-butadiene styrene (ABS), stryrene-maleicanhydride (SMA), cellulose ethers, polycarbonate (PC), polyethylene (PE), polyamides, polyethylene terephthalate, polypropylene (PP), polyvinyl chloride (PVC), polyvinylcyclohexane, phenoxy type thermoplastic polymer, polyolefins, or phenoxy-polyolefin thermoplastic blends, thermoplastic elastomer (TPE), silicone, and ultra-low density polyethylene (ULPDE) resin, and copolymers or blends thereof.

According to certain embodiments of the present disclosure, the second material is preferably thermoplastic elastomer (TPE), silicone, or ULDPE resin. Common thermoplastic elastomers includes, but are not limited to, styrenic thermoplastic elastomer (TPS), thermoplastic rubber (TPR), thermoplastic polyolefin (TPO), thermoplastic polyurethane (TPU), thermoplastic vulcanizate (TPV), and thermoplastic polyester elastomer (TPEE). In one embodiment, the first material is polypropylene and the second material is thermoplastic polyurethane.

Regarding the injection molding process, the first and the second materials may be injected simultaneously or sequentially with either the first or the second material being injected first. The simultaneous injection of the first and second materials into a mold is commonly known as "dual injection" or "double injection." Sequential injection of two or more injectants often involves injecting a first injectant into a mold having a core and a first cavity to give a preform, removing from the first cavity the preform and the core, which is then inserted into a second mold cavity, followed by injecting the second injectant over the existing preform to form a one-piece article. The above-mentioned injection molding techniques allow the manufacture of a one-piece article in which two or more injectants are bonded together. In this way, there is no need to assemble or binding two or more parts together to form a whole article. These techniques offer numerous advantages including, reduced cost (in terms of time, labor, and money), improved part reliability, and enhanced design flexibility.

In optional embodiments, the lid body further comprises a pattern layer disposed on the outer surface of the cover portion. The pattern layer comprises one or more patterns; said patterns can be used to indicate any of the following: the material of the lid or abbreviation thereof, the resin identification code, warnings, temperature resistance, the name or trademark of the manufacture or buying party, etc, or for the decorative purpose. In one embodiment, said pattern(s) in the pattern layer may be made by the first material; for example, the first material forming the cover portion may be embossed to form one or more of said patterns. Alternatively, said patterns in the pattern layer may be formed from the second material, whereby forming pattern(s) that is of different material and/or color from that of the first material. Still alternatively, a third material can be used to form one or more of said patterns; for examples, the third material can be thermoplastic materials comprising one or more thermochromics materials. In some other embodiments, each pattern in the pattern layer may be formed from one or more of the above-mentioned materials. Thermoplastic materials suitable to be blended with the thermochromics materials include, but are not limited to, PP, PE, PVC, and silicone. Said thermochromics materials, upon in contact with a temperature higher than the activation temperature thereof, turns from the first color to the second color, and when the temperature cools to below the activation temperature, it returns from the second color to the first color. There are several commercially available theremochromic pigments. In application, the third material can be used to prepare pattern(s) associated with the warning signs (such as, hot, cautious, etc.), to enhance the warning effect; alternatively, it can be used to make patterns associated with the identification of the source (e.g., the vendor's name or trademark) or other decorative patterns. When using the third material to prepare all or a portion of the pattern layer, the third material may be injected concurrently or sequentially with at least one of the first and second materials.

According to optional embodiments of the present disclosure, the lid body further comprises one or more access holes disposed on the cover portion. The access hole is configured to allow the user access the content in the container once the present lid has been placed and secured onto the container. For example, the access hole may be a drinking hole disposed near the peripheral of the cover portion so that the user may sip or suck the content from the container via the drinking hole. Alternatively, the access hole may be configured to allow the insertion of one or more utensils, such as, straw, spoon, stir stick, fork, etc. In some cases, the present lid may be configured with two access holes respectively serving one of the above-mentioned purposes.

Still optionally, the lid body further comprises a cap that is connected to the cover portion and configured to cover the access hole, in which at least one portion of the cap is separable from the cover portion to expose the access hole.

In optional embodiments, the present injection molded lid may further comprise a cap rim disposed along at least one portion of the periphery of the cap for separably connecting the portion of the periphery of the cap with at least one portion of the periphery of the access hole. To facilitate the separation of the cap from the periphery of the access hole, the thickness of the cap rim may be smaller than the thickness of the cap, or the cap and cap rim may be respectively made of the first and the second materials.

Still optionally, the cap comprises a ridge, which may ease the separation of the cap from the periphery of the access hole. For example, the user may exert a force on the ridge by pressing the ridge upward or downward, so that at least a portion of the cap is separated from at least a portion of the periphery of the access hole. According to certain optional embodiments, the cover portion may further comprise a receptacle configured to accommodate the ridge, once the cap has been lifted up from the original position.

In some optional embodiments, the present injection molded lid may further comprise an air hole disposed on the lid body. For example, the air hole may be disposed on the cap covering the access hole. Alternatively, the air hole can be disposed on the cover portion of the lid body.

The following Examples, together with accompanied drawings, are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention fully. Also, it should be noted that owing to the drawing perspective, certain elements are not presented in some of the drawings. For example, some notches disposed on the second side wall of the flange portion of the present injection molded lid may be hidden from sight.

FIG. 1A is a schematic diagram illustrating the container and lid assembly 10 in an unassembled condition, according to one embodiment of the present disclosure. As illustrated in FIG. 1A, the container and lid assembly 10 includes an injection molded lid 100 and a container, which is depicted as a cup 180 in this particular example; however, the present invention is not limited thereto. FIGS. 1B, 1C, 1D, and 1E are respectively the exploded view, top view, bottom view, and cross-sectional view of the injection molded lid 100 illustrated in FIG. 1A.

The cup 180 has a cup body 182 and a rim 184; the rim 184 is disposed at the top and along the periphery of the cup body 182 and defines an upper opening 186 of the cup 180.

The injection molded lid 100 comprises a lid body 110 and a securing member 150. Although the lid body 110 and the securing member 150 are injection molded as a one-piece article, in FIG. 1B, the lid body 110 and the securing member 150 are depicted separately for the illustration purpose.

The lid body 110 comprises a cover portion 120 and a flange portion 130 disposed around the periphery of the cover portion 120 for fitting over the rim 184 of the cup 180 (see, FIG. 1A). In this embodiment, the cover portion 120 has a raised structure in which the uppermost point (or surface) of the cover portion 120 is above the top of the flange portion 130. Also, the cover portion is shaped cylindrically with a planar top surface. However, the present injection molded lid is not limited to this particular configuration.

The flange portion 130 comprises a first side wall 132 and a second side wall 134. The first side wall 132 is connected with the periphery of the cover portion 120 (see, FIGS. 1C, 1D, and 1E). In this embodiment, the first side wall 132 and the second side wall 134 are not in direct physical contact with one another; rather, they are connected by the securing member 150. Accordingly, referring to FIG. 1B, if the securing member 150 is separated from the lid body 110, a slit 135 is observed between the first side wall 132 and the second side wall 134. As illustrated, the second side wall 134 has four notches 138 disposed thereon (FIG. 1B); however, the present disclosure is not limited thereto, and the second side wall may have any suitable number of notches. The second side wall 134 also comprises at least one bulge 137 (see, FIG. 1D), which is disposed at the inner surface thereof for engaging the injection molded lid 100 with the rim 184 of the container 180. As illustrated in FIG. 1D, there are four bulges 137, each being disposed between two adjacent notches.

Regarding the securing member 150, it comprises a frame 152 and four tabs 154. The frame 152 connects the upper sides of the first side wall 132 and the second side wall 134. Together, the inner surfaces of the first side wall 132, the second side wall 134, and the frame 152 define an interior space S (see, FIG. 1D). The interior space S is configured to accommodate and engage with the rim 184 of the container 180.

Figure 1B:
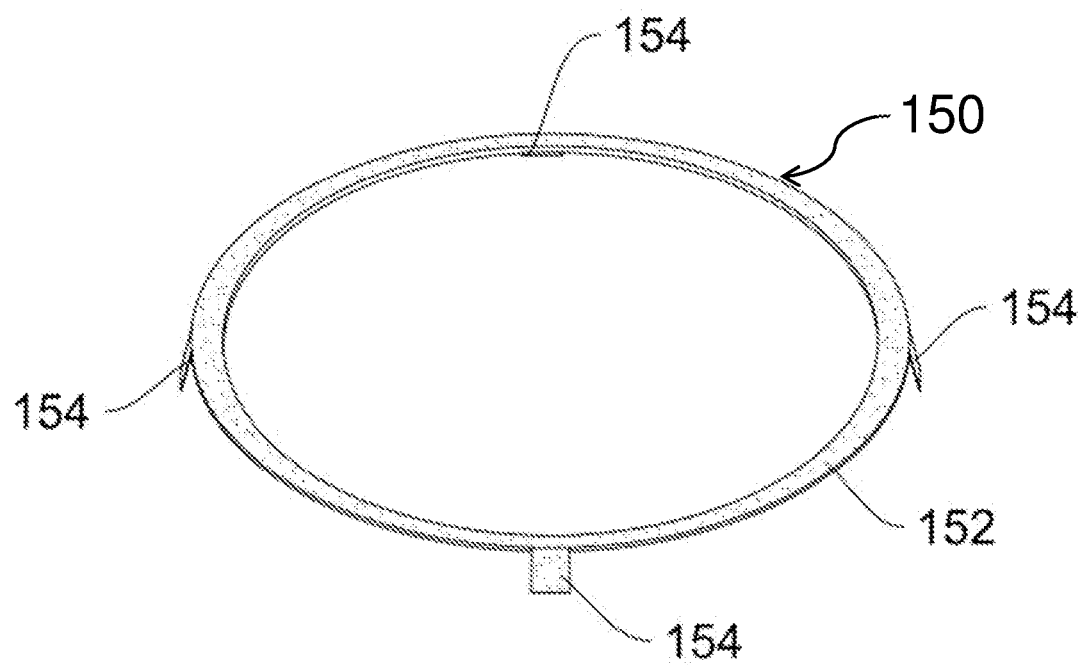
FIG. 1B is an exploded view illustrating the lid body and securing member of the injection molded lid of FIG. 1A.
Figure 1B:
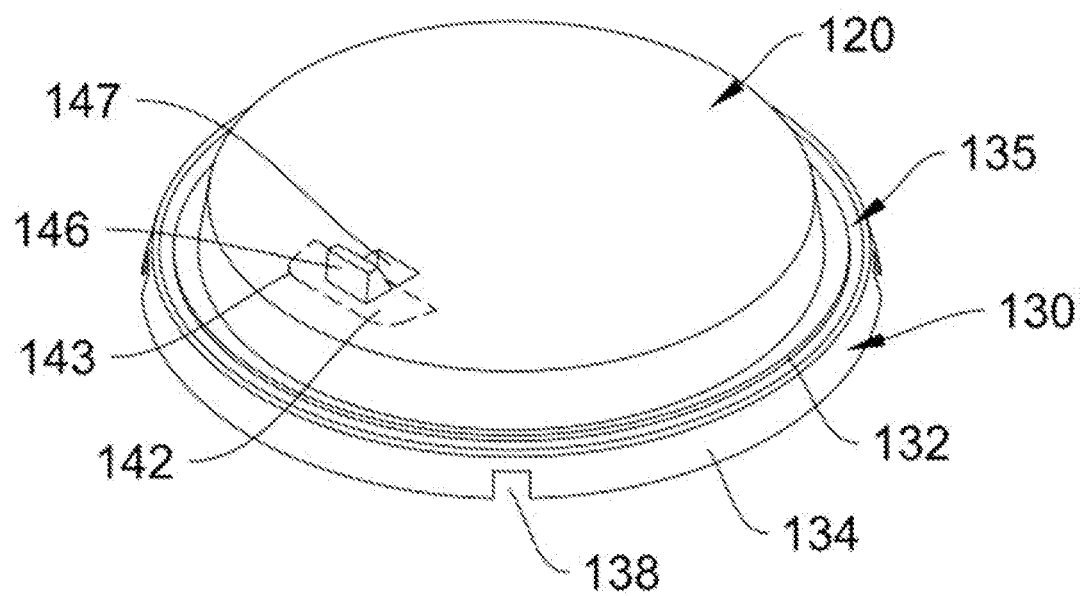
Figure 1C:
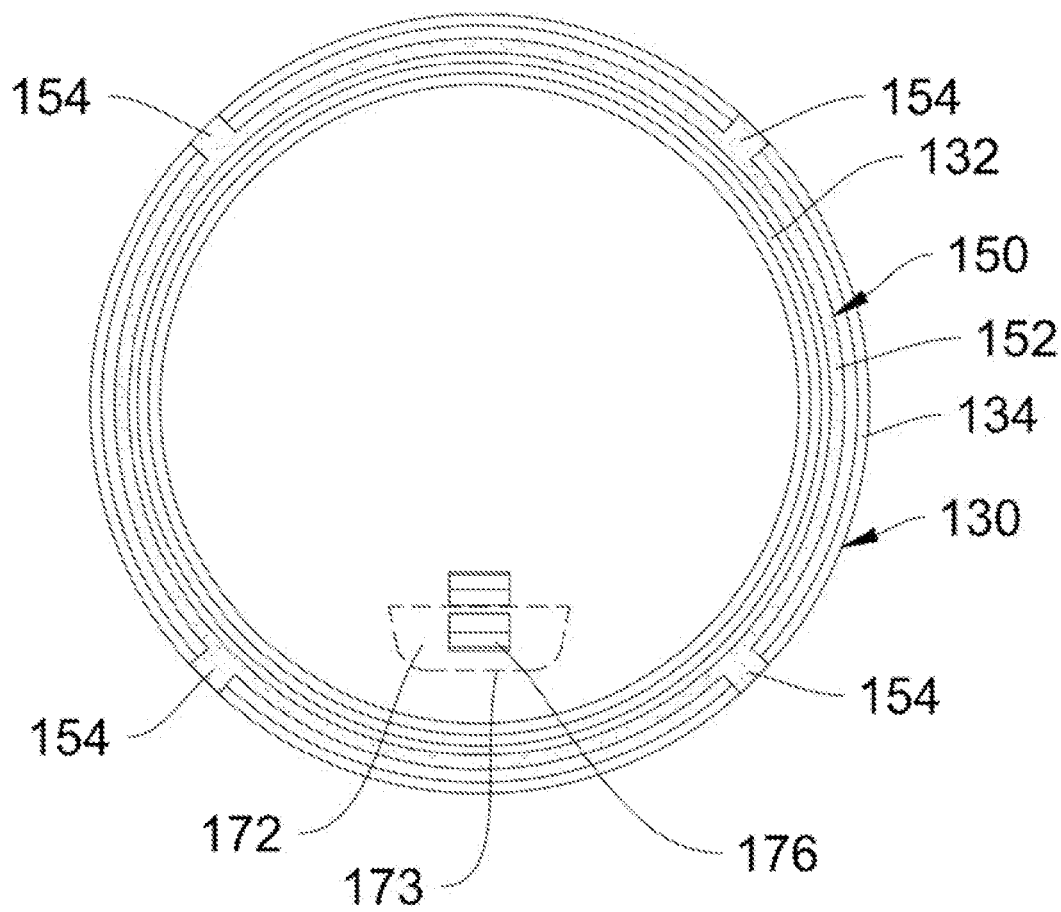
FIG. 1C is a top view illustrating the injection molded lid of FIG. 1A.
Figure 1D:
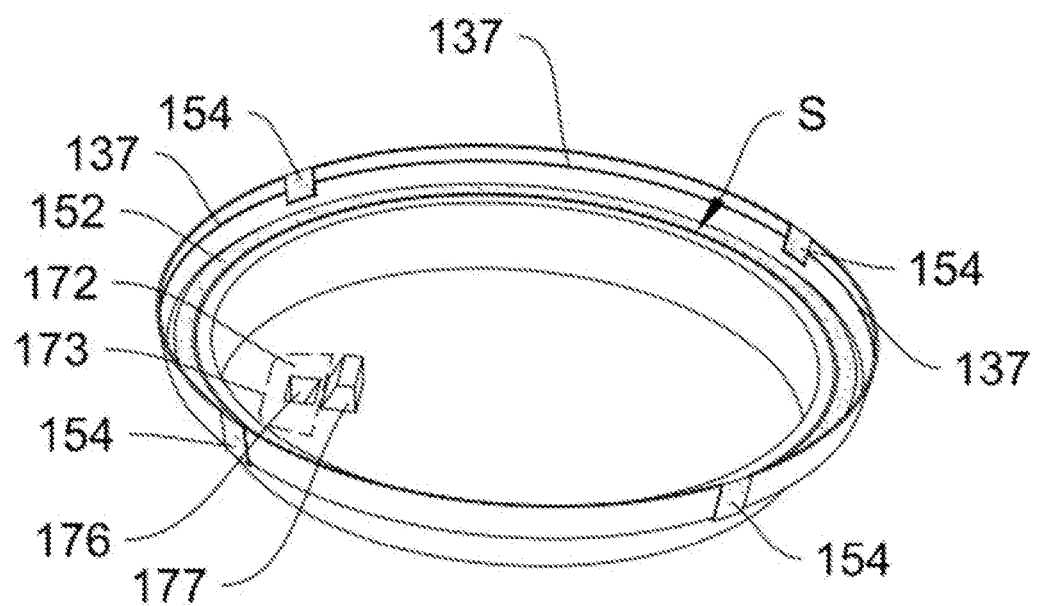
FIG. 1D is a bottom view illustrating the injection molded lid of FIG. 1A.
Figure 1E:
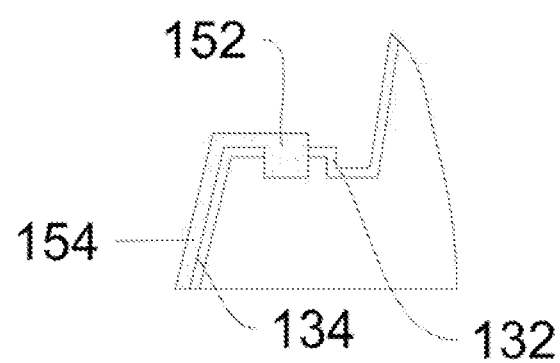
FIG. 1E is a cross-sectional view of the injection molded lid taken along the line 1E-1E in FIG. 1A.

Each tab 154 extends downwardly from the side of the frame 152 along the outer surface of the second side wall 154 and covers one notch 138 (see, FIGS. 1B & 1D). In this case, both the notch 138 and the tab 154 are rectangular in shape; however, the present disclosure is not limited thereto, and the notch may have a shape that is different from the shape of the tab.

A pattern layer (not illustrated) may be optionally disposed on the outer surface of the cover portion 120. For example, the pattern layer may comprises one or more of the above-described patterns.

The injection molded lid 100 also comprises an optional access hole (not illustrated) disposed on the cover portion 120. In this example, the access hole is configured to allow the user sip or drink the content (e.g., beverage) in the cup 180 from the access hole once the present injection molded lid 100 is secured onto the container 180. Accordingly, the access hole is disposed in adjacent to the periphery of the cover portion. Still optionally, the present injection molded lid 100 further comprises a cap 142 that is configured to cover the access hole. A cap rim 143 is disposed along at least one portion of the periphery of the cap 142 for separably connecting the cap 142 with at least one portion of the periphery of the access hole so that at least one portion of the cap 142 is separable from the cover portion 120 to expose the access hole.

Optionally, the cap may further comprise a ridge 146 disposed thereon, in which the raised ridge 146 facilitates the separation of the cap 142 from the periphery +of the access hole. Still optionally, the cover portion 120 comprises a receptacle 147, which is configured to accommodate the ridge 146 when at least one portion of the cap 142 is separated from the cover portion 120.

Although cup 180 illustrated in FIG. 1A is depicted as having a cylindrical cross-sectional shape, the present disclosure is not limited thereto, and the cup 180, as well as other containers, may have any desired cross-sectional shape, such as, the oval, polygonal, or irregular shape. As could be appreciated, the injection molded lid 100 is intended to be put atop the cup 180 to cover the opening 186 of the cup 180 and prevent the content held in the cup body 182 from being spilled out of the cup 180 easily. Accordingly, as could be appreciated, the cross-sectional shape of the injection molded lid 100 should substantially match that of the cup 180.

Figure 2A:
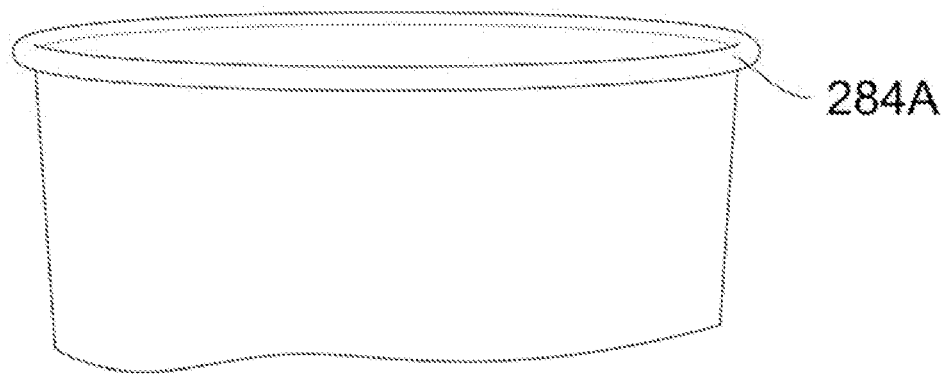
FIG. 2A and FIG. 2B are schematic diagrams respectively illustrating the cup rims according to two optional embodiments of the present disclosure.
Figure 2B:
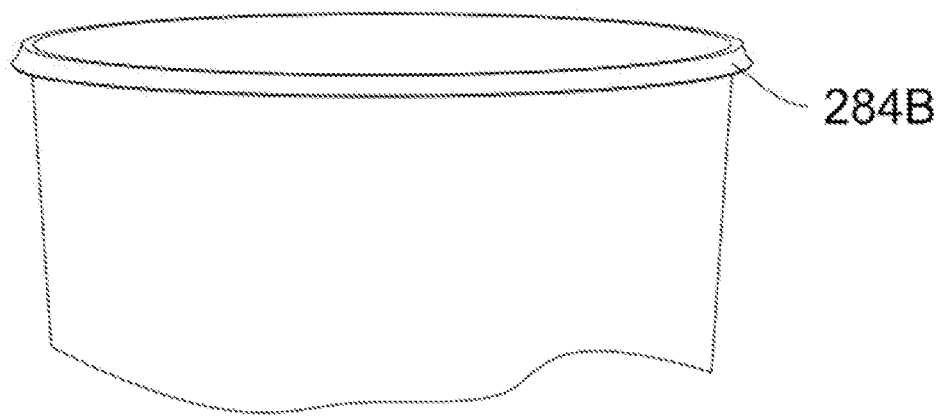

Further, one purpose of the rim of the container is for engaging with the injection molded lid. As illustrated in FIG. 1A, the rim 184 is a frame-like structure with a certain thickness that disposed around the peripheral of the cup body 182 at the top. However, the shape and the dimension of the rim may vary depending on the need(s) of the manufacturer, buying party, and/or consumer, as long as the structure of the rim allows the engagement with the present injection molded lid. In various optional embodiments, the upper surface of the rim may be curved (see, rim 284A of container 280A in FIG. 2A) or flat (e.g., rim 184 and rim 284B of container 280B in FIG. 2B). Also, the surface at the side periphery of the rim can be curved (rim 284A), flat (rim 284B), or otherwise patterned (not shown in the drawing). The lower edge of the rim may be slanted toward (rim 284A) or away from (rim 284B) the cup body, or parallel thereto ((not shown in the drawing).

Figure 3A:
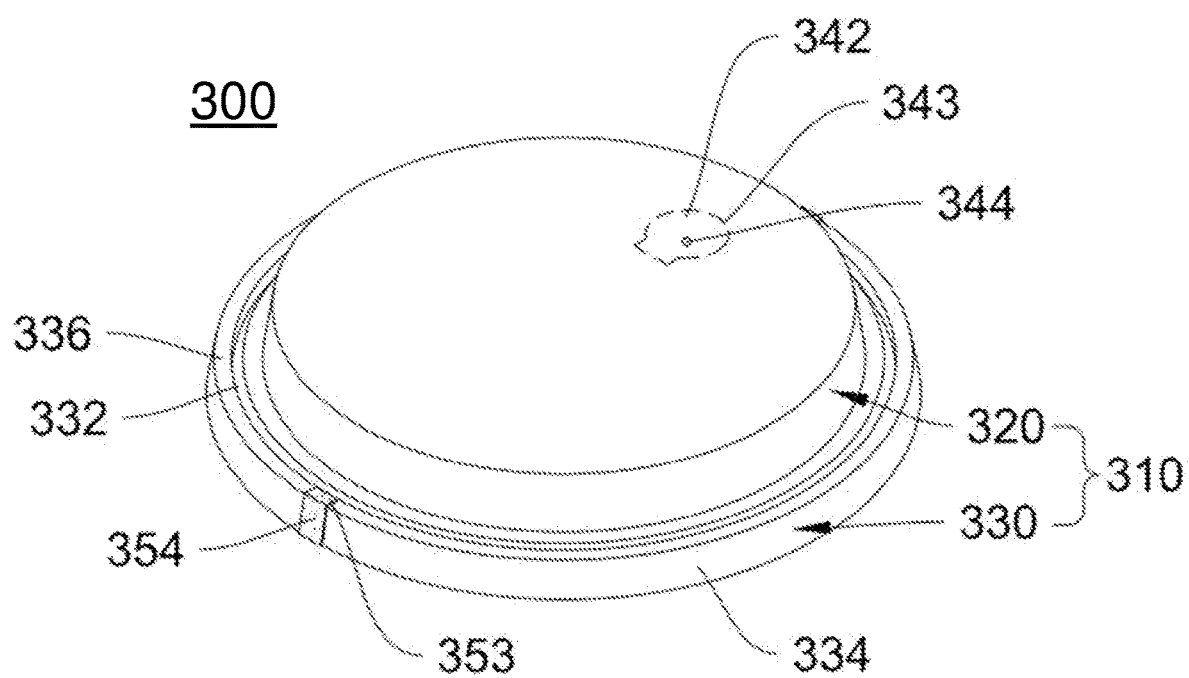
FIG. 3A is a schematic diagram illustrating an injection molded lid according to another embodiment of the present disclosure.
Figure 3B:
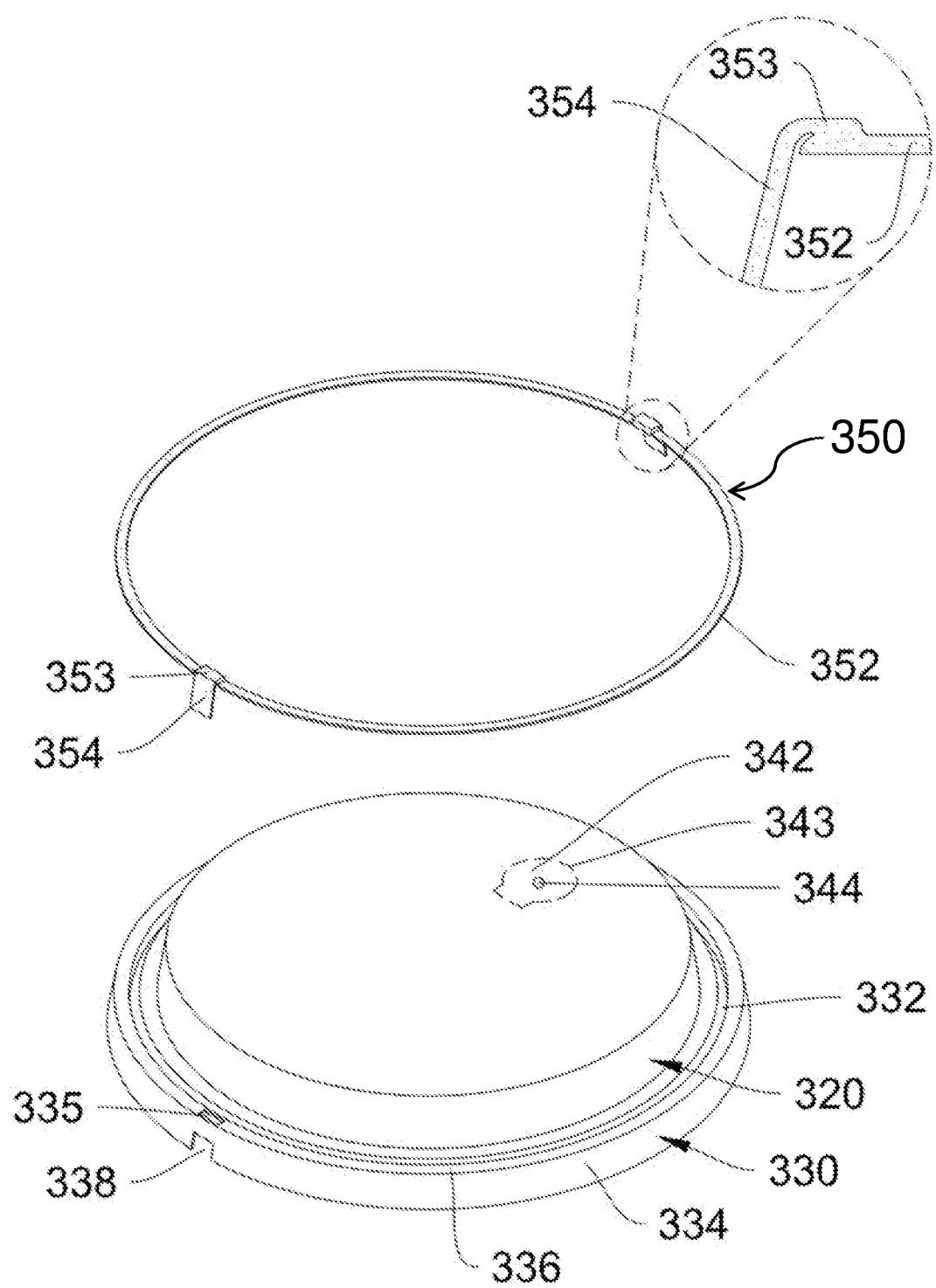
FIG. 3B is an exploded view illustrating the lid body and securing member of the injection molded lid of FIG. 3A.

FIGS. 3A to 3D illustrate an injection molded lid 300 according to another embodiment of the present disclosure. As illustrated in FIG. 3B, the injection molded lid 300 comprises a lid body 310 and a securing member 350.

The lid body 310 comprises a cover portion 320 and a flange portion 330 disposed around the periphery of the cover portion 320 for fitting over the rim of a corresponding container (such as, container 180 illustrated in FIG. 1A). The flange portion 330 comprises a first side wall 332, a second side wall 334, and a top wall 336. The first side wall 332 is connected with the periphery of the cover portion 330 (see, in particular, FIG. 3D). The second side wall 334 comprises two bulges 337 disposed at the inner surface thereof for engaging the injection molded lid 300 with the rim of said container. The second side wall 334 also has two notches 338 disposed thereon (FIG. 3B). The top wall 336 has two slits 335 disposed thereon, in which the position of each slit 335 corresponds to the position of each notch 338 (FIG. 3B). Together, the top wall 336, the first side wall 332, and the second side wall 324 define an interior space S (FIG. 3D), which is configured to accommodate and engage with the rim of the corresponding container.

The securing member 350 comprises a frame 352, two tabs 354, and two extension parts 353. The frame 352 is disposed within the interior space S and adjoins the top wall 336. Each extension part 353 extends from the frame 352 through the slit 335 and rests on the top wall 356. The tab 354 extends downwardly from the extension part 353 along the outer surface of the second side wall 354 and convers the notch 338.

Figure 3C:
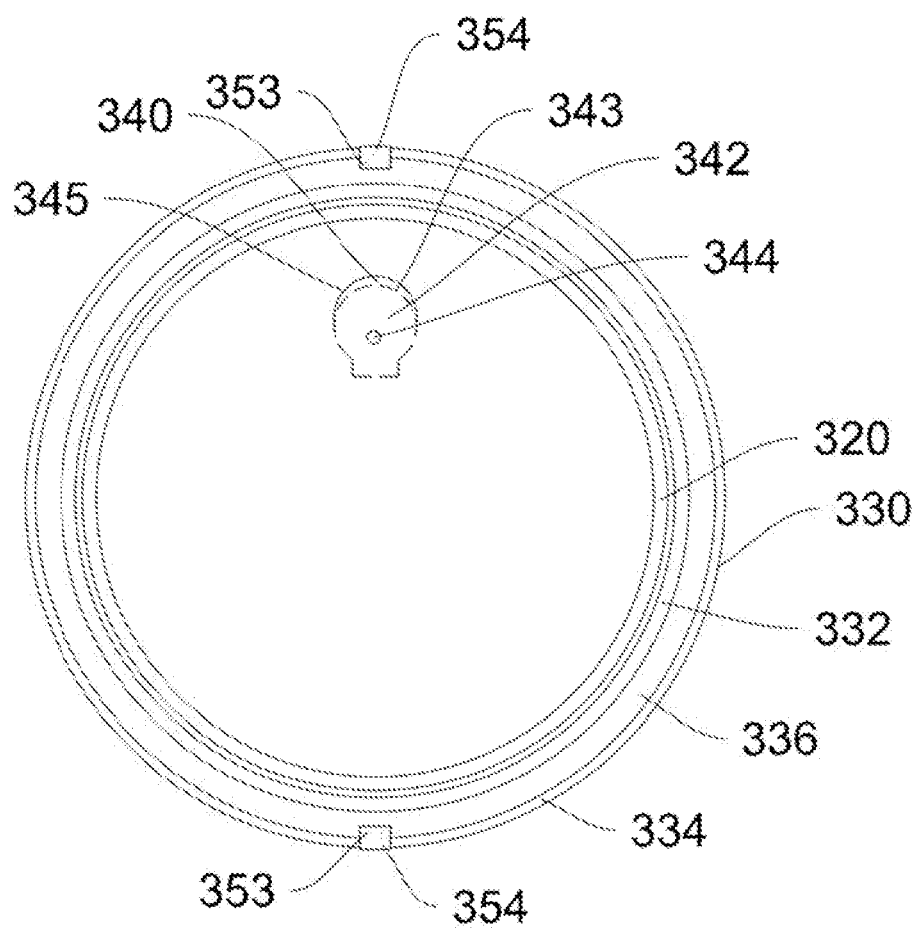
FIG. 3C is a top view illustrating the injection molded lid of FIG. 3A.

In this example, the width of the extension part 353 is substantially the same as the width of the slit 335 (see, FIGS. 3B and 3C). However, in certain optional embodiments, the extension part may further extend along the top wall so that the width of the extension part is wider than that of the slit. In the case where the position of the slit and the position of the notch do not correspond to each other, the extension part may extend along the top wall of the flange portion until it reaches the position corresponding to the notch and from where, the tab extends downwardly to cover the notch; or the tab may extend downwardly from the extension part at the slit, and then the tab extend along the periphery of the second side wall until it covers the notch. Moreover, in some examples, the flange portion may be disposed with only one slit, and the extension part extending via the slit further extends along the top wall of the flange portion, thereby forming an outer ring on the top wall, and one or more tab is extended downwardly at suitable position(s) to cover the notch(es).

A pattern layer (not illustrated) may be optionally disposed on the outer surface of the cover portion 320 of the injection molded lid 300. For example, the pattern layer may comprises one or more of the above-described patterns.

Figure 3D:
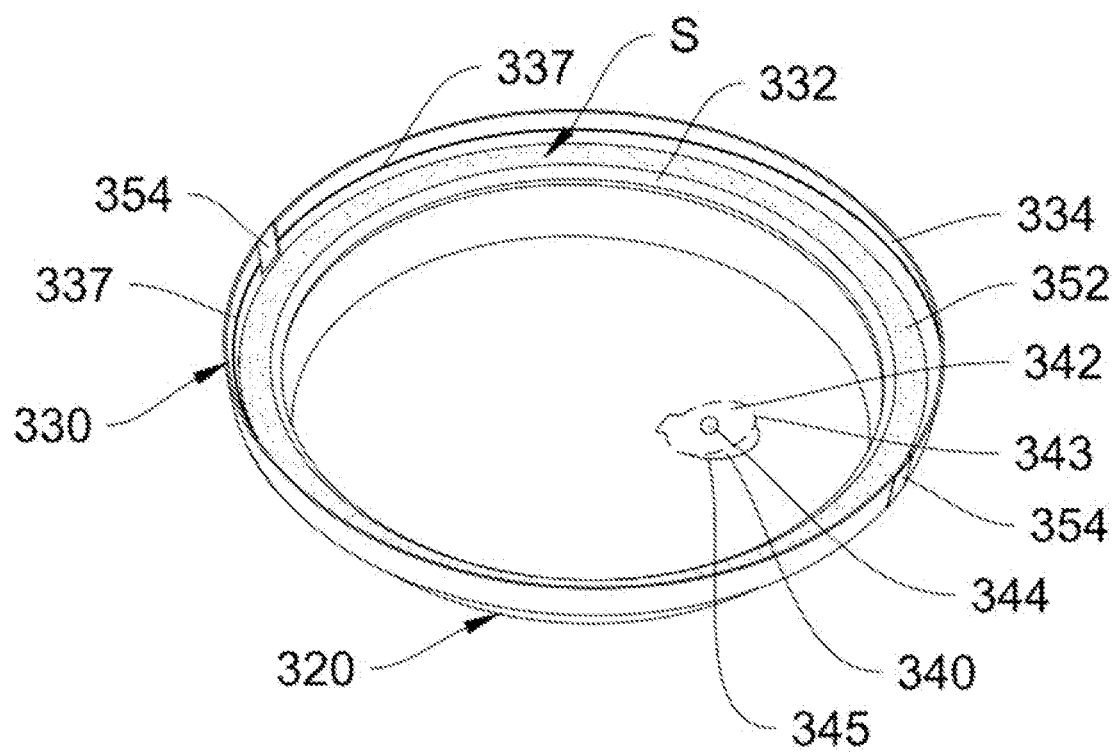
FIG. 3D is a bottom view illustrating the injection molded lid of FIG. 3A.

As illustrated in FIGS. 3B to 3D, the cover portion 320 of the injection molded lid 300 may optionally comprise an access hole 340 covered by a cap 342. A cap rim 343 is disposed along at least one portion of the periphery of the cap 342, which allows the cap 342 to be separated from the at least one portion of the periphery 345 of the access hole 340.

The cover portion 320 of the injection molded lid 300 may optionally comprise an air hole 344; in this embodiment, the air hole 344 is disposed on the cap 342 (FIGS. 3B to 3D).

Figure 4A:
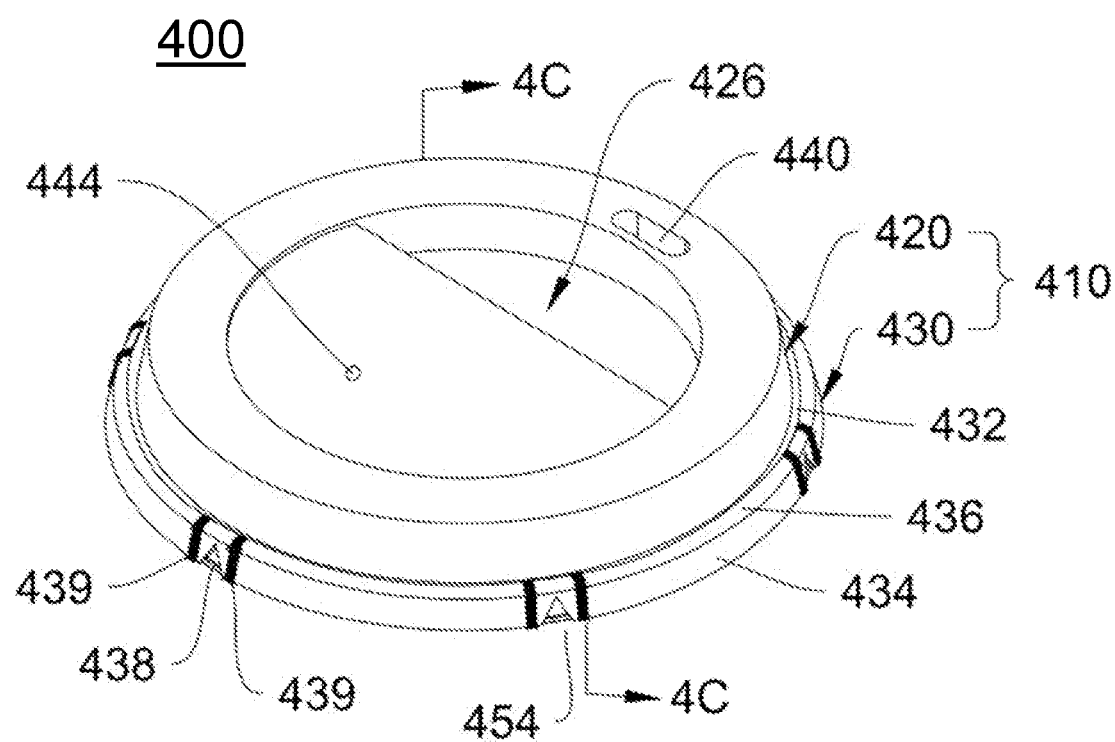
FIG. 4A is a schematic diagram illustrating an injection molded lid according to yet another embodiment of the present disclosure.
Figure 4B:
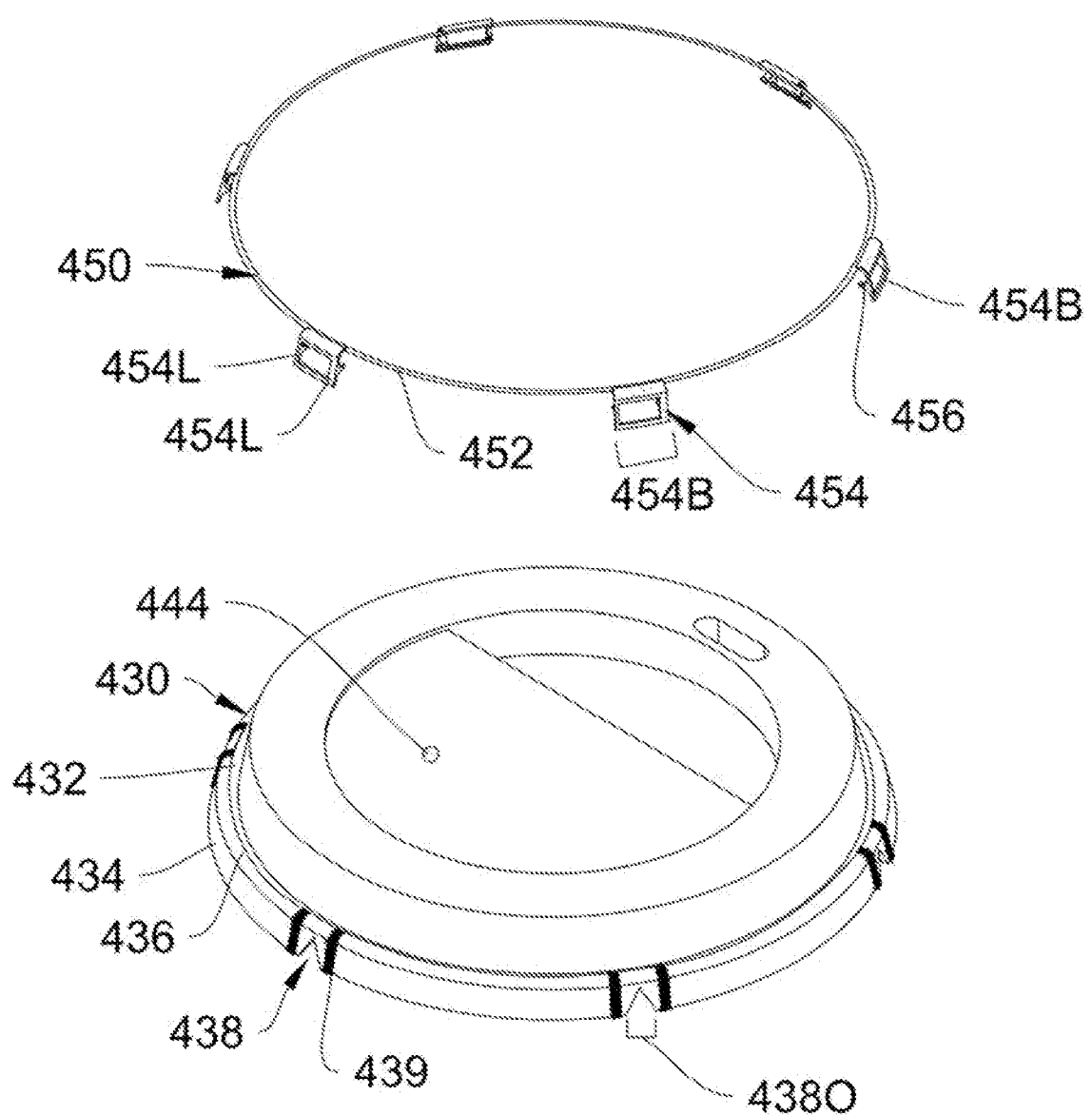
FIG. 4B is an exploded view illustrating the lid body and securing member of the injection molded lid of FIG. 4A.
Figure 4C:
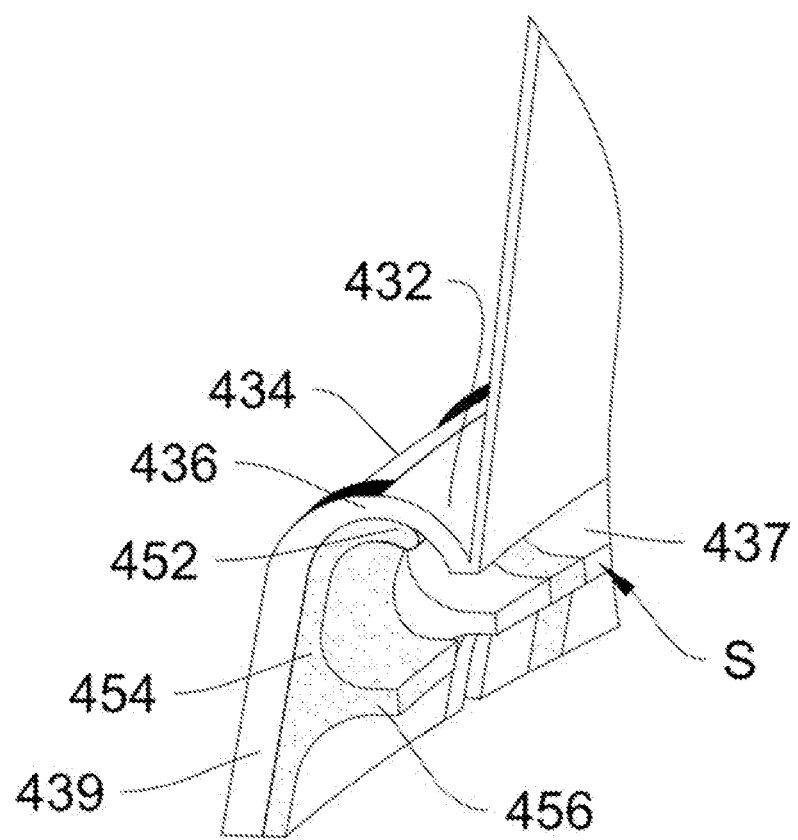
FIG. 4C is a cross-sectional view of the injection molded lid taken along the line 4C-4C in FIG. 4A.

Another embodiment of the injection molded lid 400 of the present disclosure is depicted in FIG. 4A. FIG. 4B is a cross-sectional view illustrating the injection molded lid 400 illustrated in FIG. 4A. As illustrated in FIG. 4B, the injection molded lid 400 comprises a lid body 410 and a securing member 450. FIG. 4C is a cross-sectional view taken along the line 4C-4C in FIG. 4A, which is provided to portray the structural relationship between the lid body 410 and the securing member 450.

The lid body 410 comprises a cover portion 420 and a flange portion 430 disposed around the periphery of the cover portion 420 for fitting over the rim of a corresponding container (such as cup 180 in FIG. 1A). Specifically, the flange portion 430 comprises a first side wall 432, a second side wall 434, and a top wall 436. The first side wall 432 is connected with the periphery of the cover portion 420. Together, the inner surfaces of the first side wall 432, the second side wall 434, and the top wall 436 define an interior space S (see, FIG. 4C). The second side wall 434 comprises six triangular notches 438 disposed thereon and spaced equidistantly around the periphery of the flange portion 430.

The securing member 450 comprises a frame 452 and six tabs 454 (see, FIG. 4B). The frame 452 is disposed within the interior space S and adjoins at least the inner surface of the top wall 436 of the flange portion 430 of the lid body 410 (see, FIG. 4O). Each tab 454 extends downwardly from the frame 452 along the inner surface of the second side wall 434 (see, both FIGS. 4B and 4C). As illustrated in FIG. 4B, each tab 454 has a frame-like structure comprised of two lateral sides 454L and one lower edge 454E, and the lower edge 454E of the tab 454 is disposed across the bottom opening 438O of the notch 438. Also, each tab 454 comprises two bulges 456 respectively disposed at two lateral sides 454L thereof, which are used for engaging the injection molded lid 400 with the rim of the container. In this case, the tab 454 is shaped frame-like two bulges 456 are respectively disposed on the two sides 455 of the tab. Also, as illustrated, the notch 438 is triangular, while the tab 454 is rectangular; however, the present disclosure is not limited thereto, and the notch and the tab may of the same shape in certain embodiments.

The flange portion 430 further comprises six pairs of ribs 439, wherein each rib 439 is disposed at one side of each notch 438 and along the longitudinal direction of the second side wall 434, and two lateral sides 454L of each tab 454 are respectively disposed in the ribs 439. Also, the inner surface of the second side wall 434 is recessed to accommodate the two lateral sides 454L of each tab 454 so that the contacting surface of the two lateral sides 454L (i.e., the surface configured to be in contact with the rim of the container) is level with the inner surface of the second side wall 434 that is not in contact with the tab 454.

In this example, since each tab 454 is provided with one or more (in this case, two) bulges 456 for engaging the injection molded lid 400 with the container, it is not necessary for the second side wall 434 to have the bulge. Yet, in this optional embodiment, the inner surface of the second side wall 434 is provided with several bulges 437 for further enhancing the engagement of the lid 400 with the container.

A pattern layer (not illustrated) may be optionally disposed on the outer surface of the cover portion 420 of the injection molded lid 400. For example, the pattern layer may comprises one or more of the above-described patterns.

The cover portion 420 illustrated in FIG. 4A has a recessed area 426. As could be appreciated, this recessed area (as well as any other suitable configurations) may be designed to fulfill functional and/or aesthetic needs. For example, the recessed area 426 may be used to accommodate a tea bag taken out from the container. An air hole 444 is also optionally disposed on the cover portion 420. The cover portion 420 additionally comprises an access hole 440 disposed in adjacent to the periphery of the cover portion 420. This access hole 440 allows the user sip/drink the content (e.g., beverage) in the container.

As could be appreciated, although various examples are provided above regarding the structures of the lid body and securing member of the present injection molded lid, the present invention is not limited thereto; rather, the features disclosed in the above examples can be combined with one another or with other suitable features depending on the need(s) of the manufacturers, buying parties, and/or consumers.

In view of the foregoing, the injection molded lids according to various aspects/embodiments of the present disclosure is advantageous in at least the aspects as follows. First, the present lids employ a novel securing member that has a frame and at least one tab; the frame permits the content (in particular, liquids, such as, beverages) to be consumed while reducing, if not minimizing, spillage of the content, while the tab provides additional securing means for preventing the present lids from falling off the container. Also, the lid body of the present lids comprises one or more notches that facilitate the placement of the present lid on top of the container; on the other hand, the tab of the securing member further protects the notch from splitting, thereby ensuring the integrity of the present lid. Further, during use, some users may remove the lid for various reasons and later put the lid back onto the container; the elasticity of the securing member allows such action of repeated engagement/disengagement. Last but not least, the present lids are produced by injection molding, which allows the mass production of the lids at a low cost at a rate of hundreds, thousands, or even tens of thousands per hour. In conclusion, the present disclosure provides various injection molded lids that are inexpensive to produce, and yet could provide enhanced performance in preventing leakage or spillage.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An injection molded lid for use with a container having an upper opening that is defined by a rim, comprising,
   a lid body, made of a first material and comprising a cover portion and a flange portion disposed around a periphery of the cover portion for fitting over the rim of the container, wherein the flange portion comprises a first side wall, a second side wall and a top wall, in which the first side wall is connected with the periphery of the cover portion, the second side wall comprises at least two notches disposed thereon, and inner surfaces of the first and the second side walls and the top wall define an interior space; and
   a securing member, made of a second material and comprising a frame and at least two tabs, wherein the frame is disposed within the interior space and adjoins at least the top wall, each tab extends downwardly from the frame along the inner surface of the second side wall with a lower edge of the tab disposed across a bottom opening of each notch, and each tab comprises at least one bulge thereon.

2. The injection molded lid of claim 1, wherein the number of the notch is equal to the number of the tab.

3. The injection molded lid of claim 1, wherein,
   the first material and the second material are different materials with a same color or different colors; or
   the first material and the second material are the same material but with different colors.

4. The injection molded lid of claim 1, wherein each of the first material and the second material is independently selected from the group consisting of, polystyrene (PS), copolymers of carboxylic acid monomers with ethylene, polystyrene-acrylonitrile (PSAN), acrylonitrile-butadiene styrene (ABS), stryrene-maleicanhydride (SMA), cellulose ethers, polycarbonate (PC), polyethylene (PE), polyamides, polyethylene terephthalate (PET), polypropylene (PP), polyvinylcyclohexane, polyvinyl chloride (PVC), phenoxy type thermoplastic polymer, polyolefins, phenoxy-polyolefin thermoplastic blends, thermoplastic elastomer (TPE), silicone, and ultra-low density polyethylene (ULDPE) resin, and copolymers or blends thereof.

5. The injection molded lid of claim 1, wherein the first material is polypropylene and the second material is polyurethane.

6. The injection molded lid of claim 1, wherein the lid body further comprises a pattern layer disposed on the outer surface of the cover portion.

7. The injection molded lid of claim 6, wherein the pattern layer is made from the first material, the second material or a third material, or a combination thereof.

8. The injection molded lid of claim 7, wherein the third material is a thermoplastic material comprising a thermochromic material.

9. The injection molded lid of claim 1, wherein the inner surface of the second side wall comprises at least one recessed area, and the tab is disposed in the at least one recessed area.

10. The injection molded lid of claim 1, wherein the flange portion further comprises at least one pair of ribs, wherein each rib is disposed at one side of the notch and along the longitudinal direction of the second side wall, and the two sides of the tab is disposed in the ribs, respectively.

11. The injection molded lid of claim 1, wherein the lid body further comprises an access hole disposed on the cover portion.

12. The injection molded lid of claim 1, further comprising an air hole disposed on the lid body.

13. The injection molded lid of claim 1, wherein the second side wall comprises at least one bulge disposed at the inner surface thereof.

* * * * *